Dec. 23, 1952  C. G. PARDEE  2,622,640
MULTIPLE CLAMPING DISK CUTTER HEAD
Filed Dec. 4, 1947
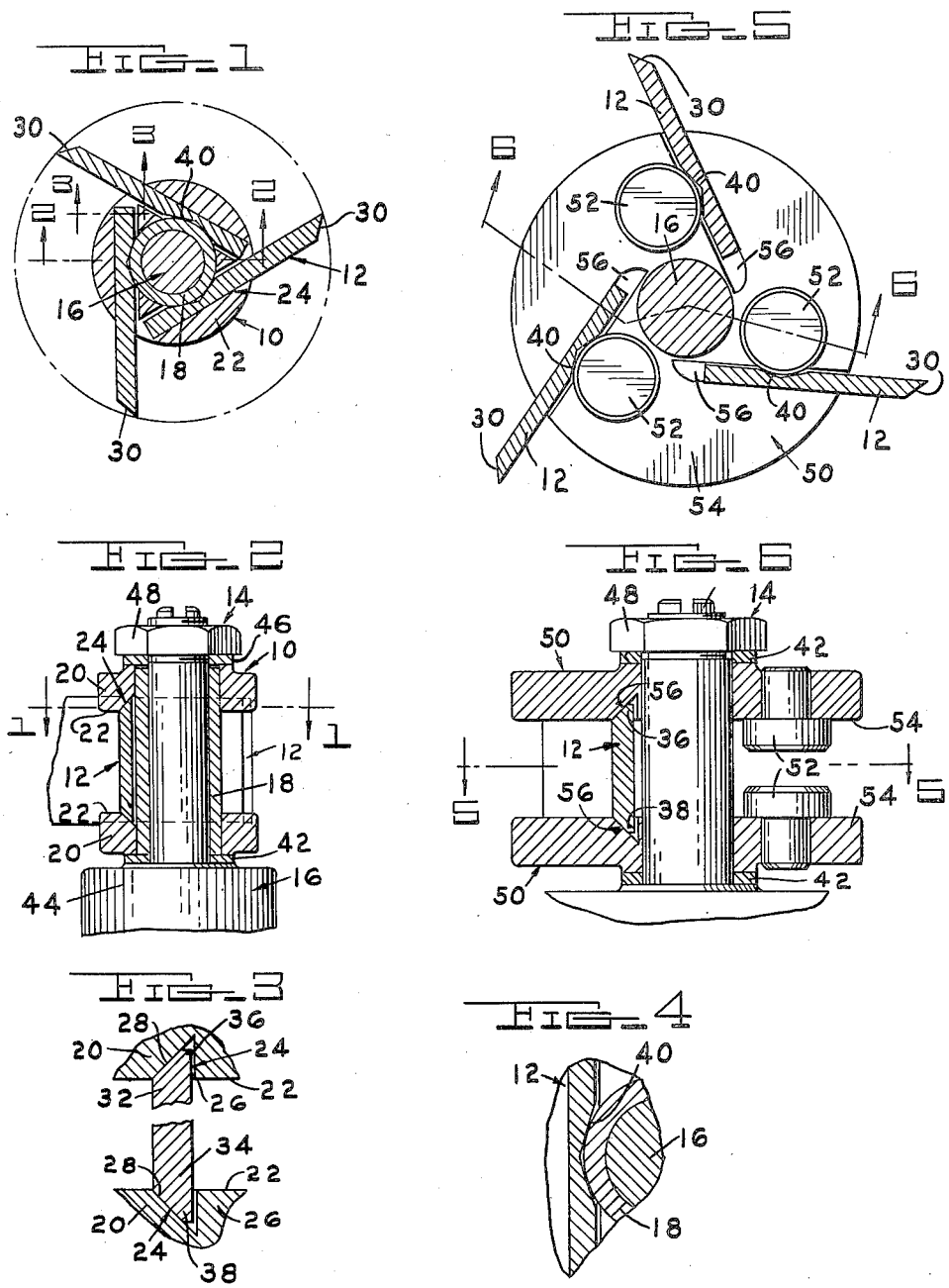
INVENTOR.
CURTIS G. PARDEE
BY
Joseph R. Teagno
ATTORNEY Patented Dec. 23, 1952

2,622,640

UNITED STATES PATENT OFFICE 2,622,640

MULTIPLE CLAMPING DISK CUTTER HEAD

Curtis G. Pardee, Detroit, Mich.

Application December 4, 1947, Serial No. 789,583

5 Claims. (Cl. 144—231)

1

This invention relates to cutters and more particularly to the supporting or mounting thereof for use with woodworking apparatus.

Broadly the invention comprehends the provision of a simple mounting of cutter members of a cutter assembly for woodworking shapers or the like which are securely and positively held in the operational use thereof.

Although numerous supporting means have been previously devised for the holding of cutter blades or members of wood-working machines, none is believed to incorporate simplicity of structure and security that the blades will not fly loose in the operational use thereof. The present cutter blade supporting means although simple in embodiment affords a positive means for securing the blades during their operational use.

An object of the invention is the provision of a simple, economical cutter blade supporting means that basically entails solely three fundamental cooperative members.

Another object of the invention is the provision of a supporting or mounting mechanism for woodworking shaper machine cutter blades that are effective for firmly holding the cutter blades as a unit and which prevent the blades from coming free from the supporting mechanism during the operational use thereof.

A further object of the invention is the provision of cutter blade supporting means wherein each blade of a cutter assembly is firmly clamped and individually prevented from coming free from its clamped position.

A yet further object of the invention is the provision of means for the supporting of cutter blades of a cutter assembly permitting of the use of the same cutter blades for varied size cutting operations.

Other objects and advantages of the invention will appear from the following description taken in connection with the drawings, forming a part of the specification; and in which:

Fig. 1 is a horizontal cross-sectional view taken substantially along line 1—1 of Fig. 2;

Fig. 2 is a vertical cross-sectional view of a cutter blade assembly and supporting means therefor;

Fig. 3 is a fragmentary enlarged cross-sectional view taken substantially along line 3—3 of Fig. 1;

Fig. 4 is a horizontal cross-sectional top plan view of a modified cutter blade supporting means;

Fig. 5 is a vertical cross-sectional view taken substantially along line 5—5 of Fig. 4; and Fig. 6 is a fragmentary enlarged cross-sectional

2 view of the blade locking means of the structures of Figs. 1 and 4.

The present invention is predicated upon the provision of a simple, economical, and effective means for securely holding or supporting and locking means for cutter blades of a woodworking machine cutter assembly.

These results are attainable through the provision of a cutter blade supporting mechanism comprising a pair of collar members arranged in spaced opposing relation to one another upon a supporting shaft or sleeve and having complementary grooves in the opposed surfaces thereof running at predetermined angular relation to one another and the axis of the supporting shaft and having a portion thereof intercepting the outer circumference of the shaft and receiving in said grooves appropriate cutter blades or members each having a notch which receives the exterior surface of the shaft in contacting relation. The grooves in the collars are of such shape that upon the axial movement of the collars toward one another with the cutters therebetween the cutters are moved into firm bearing contacting relation with the shaft so as to be held in firm assembly and without possibility of working free from clamped assembly position.

Because of the provided arrangement of grooves, shape thereof, cooperating shape of that portion of the blades received by the grooves and notch provided in the blades, the blades can be adapted for use with other structures necessitating larger cutting diameters thereby utilizing a great saving in the adaptation of one set of cutters to an infinite number of sizes of cutting or shaping operations.

By positively locking the cutter blades from coming free from their supporting mechanism even if a loosening of the clamping means may occur, the cutter blades as adapted to cutter assemblies of woodworking shapers can be used in operation with complete safety to the machine operator.

Referring to the drawings and especially Figs. 1 through 3 for more specific details of the invention wherein like numerals refer to like parts, 10 represents generally a cutter blade assembly for woodworking shapers and the like comprising a plurality of cutter blades 12 going to make up a cutter or shaper set, and a blade supporting, holding, and locking mechanism 14.

The mechanism 14 which is adapted to be mounted upon a spindle 16 of a woodworking shaper or the like comprises a sleeve 18 fitted over the spindle and a pair of identical collars 20 fitted on the sleeves and adapted to be axially spaced from one another at the ends of the sleeve with the blades 12 received therebetween.

The collars 20 each are provided on one face 22 thereof with a plurality of grooves 24 extending angularly thereacross in predetermined spaced relation. The grooves tangentially intercept the outer surface of the sleeve 18 over an arcuate portion thereof, the purpose of which will hereinafter appear and each provide a wall 26 running parallel to the axis of the spindle and sleeve and an angular wall 28 converging toward the wall 26 below the top surface of the face 22 of the collars, the purpose of which will hereinafter appear.

The cutter blades 12 are identical in size and shape and each are of a thickness substantially equal to the maximum width of grooves 24 and have a cutting face 30 which is tapered back away from the leading edge thereof as shown by Fig. 1 in accordance with general practice. The blades 12 each have a top and bottom 32 and 34 respectively terminating in tapers 36 and 38 adapted to conform with the shape of the grooves 24 to be received thereby in the clamping of the cutters between the collars. The shape of face 30 of the blades although here shown as lying in a plane perpendicular to the top and bottom of the cutter are intended to be of a shape corresponding to the desired cutting pattern to be performed upon associated work members.

The blades 12 have each provided on the inner side thereof a notched structure 40 adapted to bear upon an arcuate portion of the sleeve so as to positively lock the cutter blades when in assembled position and further to accurately set the blades relative to one another as a cutter set.

As a simple, economical way to provide the notches 40, a V-milling operation is performed such that line bearing contact is provided in the assembly of the cutters upon sleeve 18.

In assembling the cutter blades into the assembly 10 shown by Figs. 1 and 2, a suitable washer 42 is first placed upon the hub 44 of the spindle and the sleeve 18 fitted over the spindle shaft. Then one of the collars is slipped over the sleeve into abutting relation upon the washer 42 with the grooved surface thereof oppositely disposed from the washer. Next the cutter blades are arranged in the grooves with their cutting faces extending radially outwardly and their notched sides in contacting relation about the circumference of the sleeve and with the other collar arranged upon the blades receiving the conforming portion thereof in the grooves thereof. Another washer 46 similar to washer 42 is placed upon the collar and a suitable nut 48 is threaded upon the end of spindle 16 bearing upon washer 46 and acting to firmly clamp the cutter blades between the collars 20 as the nut is tightened upon the spindle. With provision being made as to the relative dimensions of the sleeve, grooves, taper and notch sufficient clearance is provided between the inner straight side of the blades and wall 26 so that the walls of notch 40 will bear firmly upon sleeve 18 without possibility of interference from the straight wall 26. The angular wall 28 and taper on the blades are so made as to provide for a slight relative movement therebetween in bringing the blades into snug clamping relation upon sleeve 18. With the nut firmly secured upon the spindle and the blades clamped between the collar, it is evident that the blades cannot free themselves from the assembly and even if the nut became loosened merely a loosening and not a freeing of the blades would occur.

Through the provision of the basic principle of structure shown by Figs. 1 through 3, the blades 12 can be utilized in connection with an operation requiring a bigger cutting radius merely by providing collar members 50 having a plurality of equal angularly spaced posts 52 on one face 54 thereof adapted to serve the same purpose as sleeve 18 of the structure of Figs. 1 and 2. The members 50 are each provided with a plurality of grooves 56 in the face 54 thereof each intercepting a post 52 and adapted to be cooperative therewith in holding the blades in assembly in a like manner to collars 20.

While this invention has been described in connection with a certain specific embodiment, the principle involved is susceptible of numerous other applications that will readily occur to persons skilled in the art. The invention is, therefore, limited only as indicated by the scope of the appended claims.

What I claim is:

1. A cutter assembly comprising a rotatable spindle, a pair of collars concentric to and axially spaced from one another on the spindle each having a plurality of like chordal recesses in the surface thereof arranged in opposing relation to one another, a plurality of cutter blades arranged in the recesses between the collars each having a recess on one side thereof receiving an arcuate portion of the spindle when arranged between the collars and means axially clamping the collars and blades as a unit upon the spindle.

2. A cutter assembly comprising a rotatable spindle, a pair of cylindrical members on the spindle arranged axially spaced relative to one another each having a plurality of substantially chordal grooves in opposing faces thereof tangentially intercepting a portion of the spindle, a plurality of cutter blades arranged between the members having parts complementary to the grooves and received thereby and each having an axially arranged notch receiving a portion of the external surface of the spindle in bearing contact, and means securing the blades, collars, and spindle together as a solid unit.

3. A cutter assembly comprising a rotatable member, a pair of substantially identical collars received on the member in axially spaced relation each having one or more recesses in opposing faces thereof extending thereacross and tangentially intercepting the external surface of the member, one or more cutter blades corresponding in number to the recess or recesses in the face of each collar arranged between the collars each having parts substantially complementary to the recesses in the collars and a part extending radially beyond the outer periphery of the collars presenting a cutter face and that portion of the blade in the collar recesses having a part embracing an arcuate portion of the spindle and means on the member for clamping the collars axially upon the blade or blades.

4. A cutter assembly comprising a rotatable member, a pair of substantially identical collars concentrically received on the member axially spaced from one another each having a plurality of recesses extending across opposing faces of the collars in alignment relation, said recesses having a wall extending parallel to the axis of the spindle and an angular wall converging with the other wall below the face surfaces of the collars, and a plurality of cutter blades arranged between the collars having parts received by and complementary to the recesses in the collars and a recess in a surface thereof receiving an arcuate portion of the member therein, and means clamping the cutter blades between the collars such that the blades are moved into contacting relation upon the members and secured as a unit with the collars upon the member.

5. A cutter assembly comprising a rotatable member, a pair of substantially identical collars on the rotatable member axially spaced from one another each having a plurality of angularly spaced recesses in the opposing faces thereof, a plurality of cutter blades arranged between the collars in complementary relation in the recesses each having a portion extending beyond the external periphery of the collars and a V-shaped cross section axial recess extending entirely across the width thereof between the collars receiving a portion of the rotatable member in line bearing relation thereto, restraining radial movement of the blades from assembly between the collars, and means holding the member, collars, and blades together as a unit.

CURTIS G. PARDEE.

REFERENCES CITED

The following references are of record in the file of this patent:

UNITED STATES PATENTS

| Number | Name | Date |
|---|---|---|
| 400,673 | Hardy | Apr. 2, 1889 |
| 505,043 | Glidden et al. | Sept. 12, 1893 |
| 1,380,686 | Stull | June 7, 1921 |
| 1,451,995 | Madsen | Apr. 17, 1923 |
| 1,745,701 | Miller | Feb. 4, 1930 |
| 1,782,243 | Queston | Nov. 18, 1930 |
| 1,820,231 | Lane | Aug. 25, 1931 |
| 2,298,723 | Rice | Oct. 13, 1942 |

FOREIGN PATENTS

| Number | Country | Date |
|---|---|---|
| 107,243 | Sweden | Apr. 27, 1943 |